United States Patent [19]

Enk et al.

[11] Patent Number: 4,872,898
[45] Date of Patent: Oct. 10, 1989

[54] CENTERING AND LEVELING OF MOBILE PRESS BENDING APPARATUS

[75] Inventors: Allan T. Enk, Toledo, Ohio; Jeffrey R. Flaugher, Carlton, Mich.

[73] Assignee: Libbey-Owens-Ford Co., Toledo, Ohio

[21] Appl. No.: 312,120

[22] Filed: Feb. 17, 1989

[51] Int. Cl.[4] ............................................. C03B 23/033
[52] U.S. Cl. ........................................ 65/287; 65/104; 65/273
[58] Field of Search ..................... 65/104, 374.11, 273, 65/287

[56] References Cited

U.S. PATENT DOCUMENTS

| | | | |
|---|---|---|---|
| 3,934,996 | 1/1976 | Frank | 65/273 X |
| 3,951,634 | 4/1976 | Hall et al. | 65/273 X |
| 4,111,676 | 9/1978 | Mechling et al. | 65/104 X |
| 4,421,225 | 12/1983 | Hetman, Jr. | 65/273 X |

Primary Examiner—Arthur Kellogg
Attorney, Agent, or Firm—Marshall & Melhorn

[57] ABSTRACT

The invention pertains to a press bending apparatus incorporated in a mobile carriage mounted upon retractable wheels adapted to be carried upon rails extending transversely of the production line whereby it can be readily moved into and out of operative position in the line. Mechanism is included for vertically moving the carriage between a raised transport position and a lowered operating position. Centering and levelling means are provided for assuring proper alignment of the press members and associated conveyor rolls with the adjacent heating and tempering sections as the apparatus is moved into operating position.

17 Claims, 8 Drawing Sheets

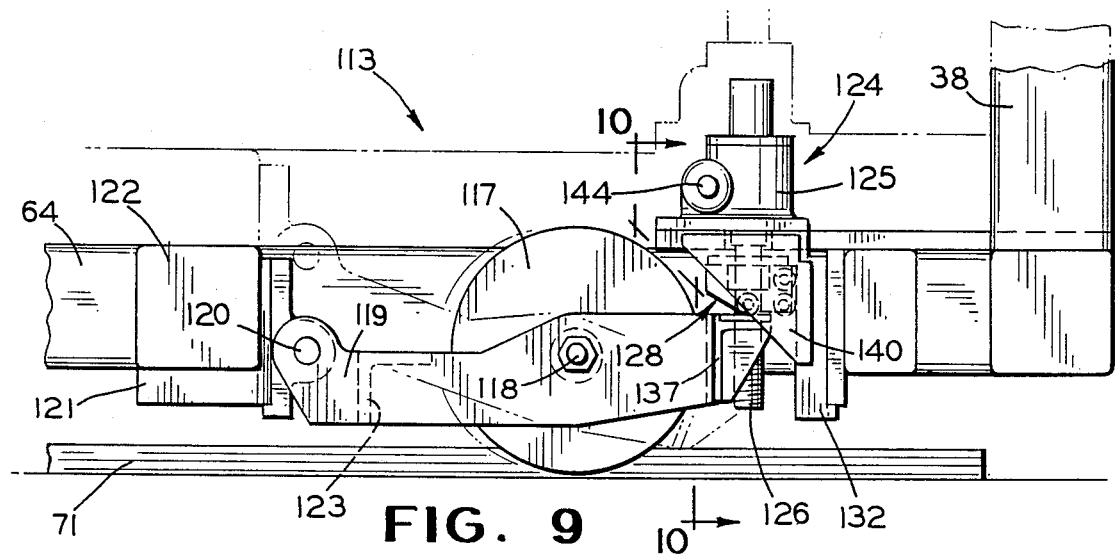
FIG. 9
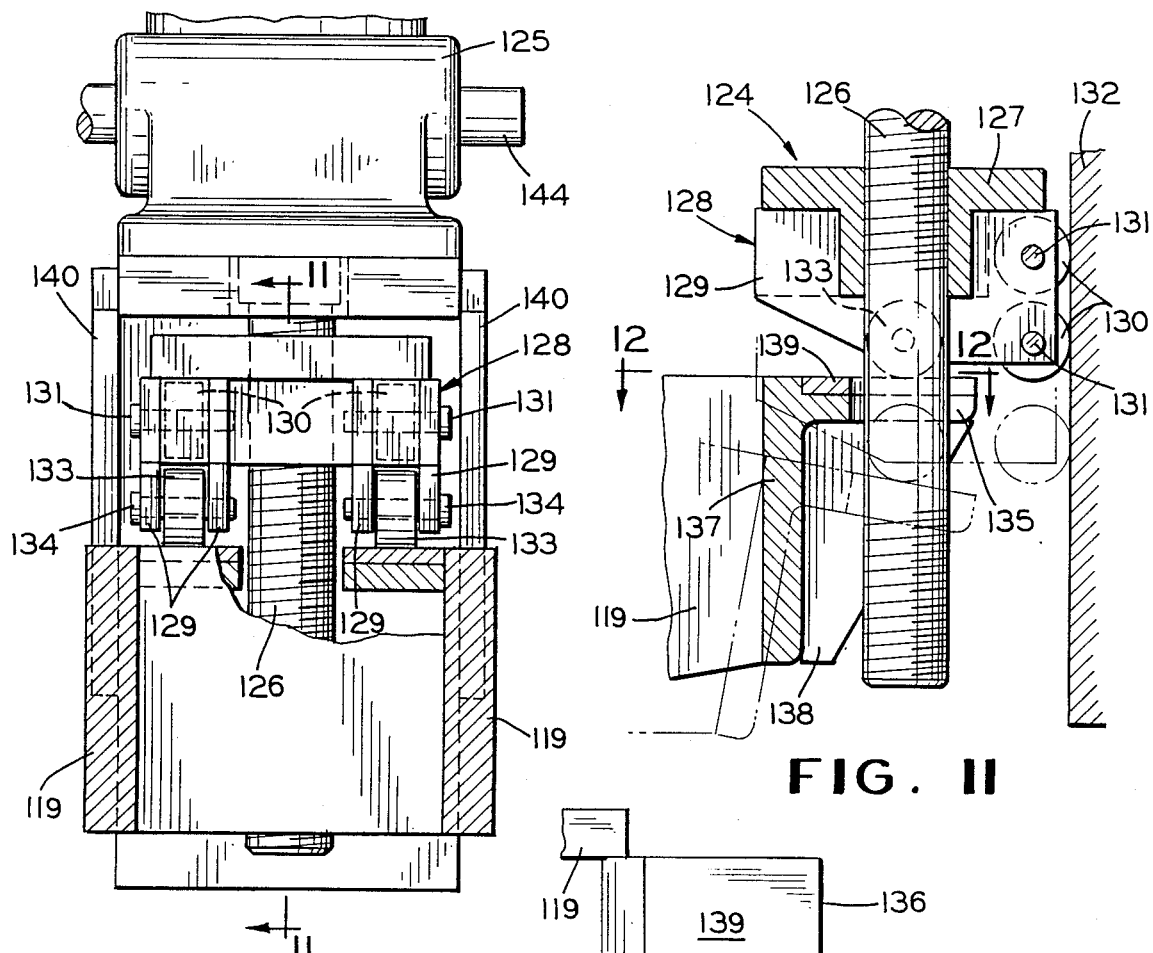
FIG. 10
FIG. 11
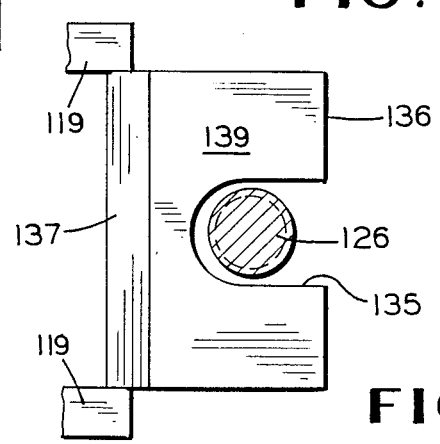
FIG. 12

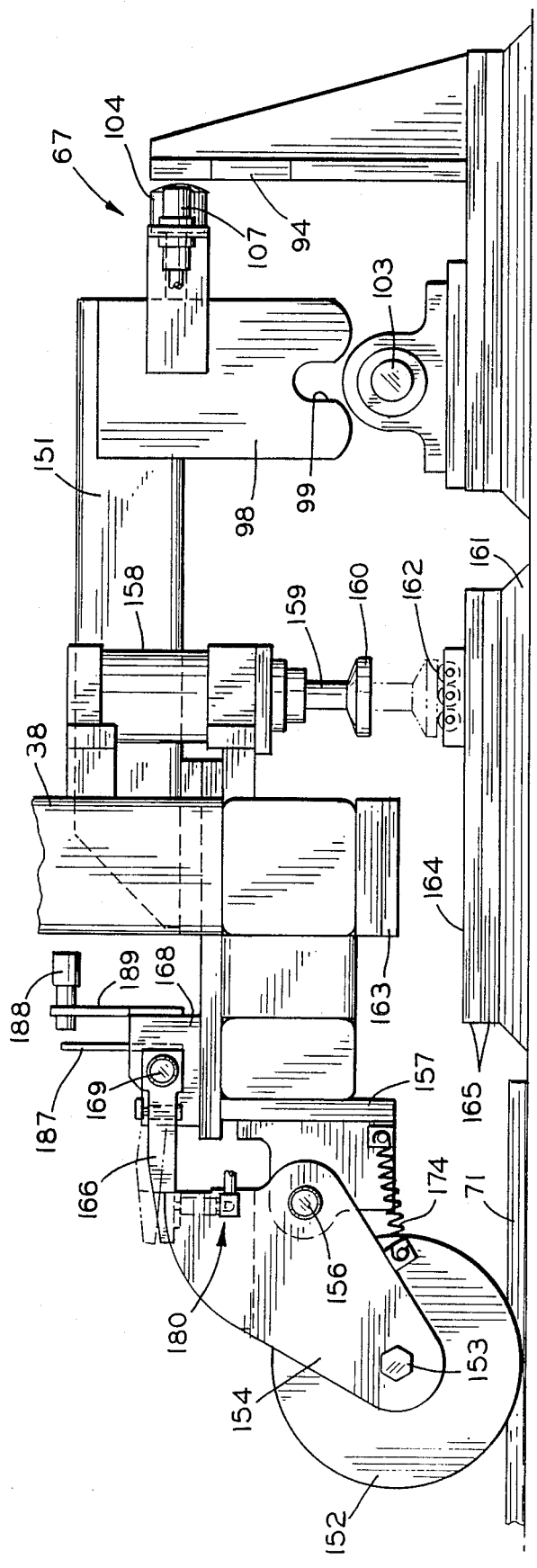
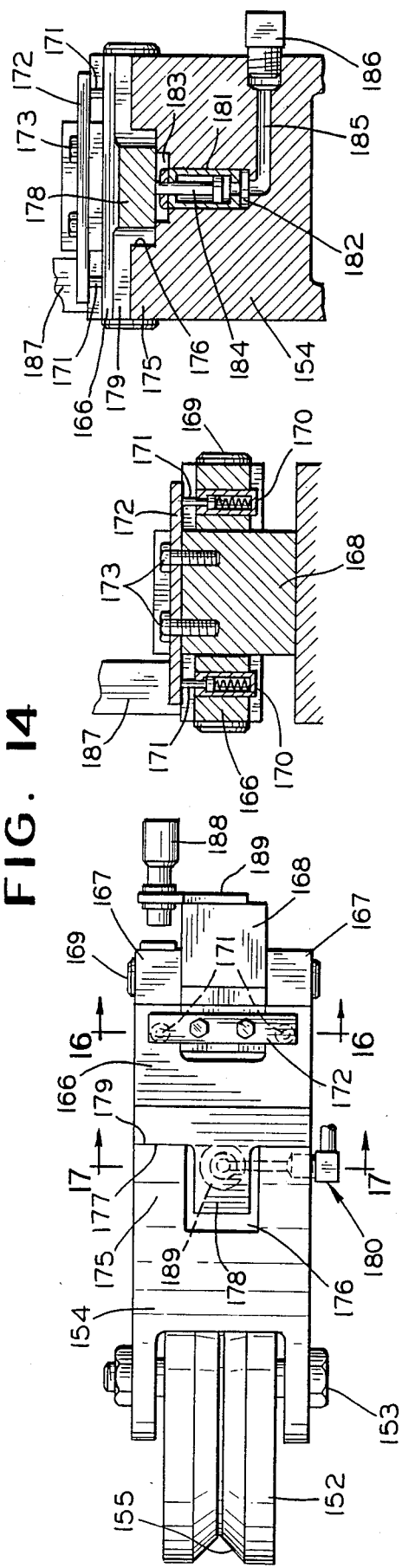
FIG. 14
FIG. 15
FIG. 16
FIG. 17

CENTERING AND LEVELING OF MOBILE PRESS BENDING APPARATUS

BACKGROUND OF THE INVENTION

1. Field of the Invention

The present invention pertains generally to apparatus for press bending glass sheets, and more particularly to mobile press bending units incorporating means for centering and levelling the units as they are moved into operative position in a press bending line.

2. Description of the Prior Art

Curved or bent glass sheets are commonly employed as glazing closures for automobiles and the like. The configuration of the glazing closure, that is, the size, shape and curvature, is dictated by the opening in which the unit is to be installed and the overall design of the automotive vehicle. As will be readily apparent, with the many different designs and body styles of automotive vehicles in production at any one time, it is necessary to produce many different styles of glazing closure.

In a preferred method of producing such glazing closures in the large quantities required for efficient production, flat sheets of glass are heated to their softening temperature. The softened sheets are pressed to the desired curvature between complemental shaping surfaces, and the curved or bent sheets are then rapidly chilled in a controlled manner to a temperature below the annealing range of glass. These operations are generally carried out successively while the sheets of glass are being substantially continuously advanced by conveyor along a horizontal path including, in succession, a heating area, a bending area, and a chilling or tempering area, whereupon the residual heat in the sheet following bending can be utilized for the final heat treating or tempering operation.

The aforementioned complemental shaping surfaces are formed on opposed press members, each mounted on a supporting platen. The press members and their respective platens are normally located one above and one below the horizontal path of movement of the glass sheets to receive the sheets therebetween, and are relatively movable toward and away from each other for pressing the sheets to the desired shape. A hydraulic cylinder is generally employed for raising the lower platen and press member upwardly to engage and lift a heated glass sheet from the conveyor system, out of the horizontal path, and press it against the shaping surface of 10 the opposed or upper press member. The lower platen is then lowered to deposit the bent sheet upon the conveyor system for advancement into and through an adjacent tempering section.

As heretofore mentioned, in order to supply the needs of automobile assembly plants many differently configured glazing units are required. Moreover, with the tendency of such assembly plants to eliminate or minimize stockpiling of parts and rely upon frequent and uninterrupted delivery of the various parts, it has become increasingly important to be able to rapidly shift from production of one part to another. Conventionally, a variety of curved glazing closure parts is produced on an individual production line. Each different part, of course requires the use of different complemental shaping surfaces on the opposed press members particularly adapted to achieve the desired configuration. Initially, this was accomplished by changing the upper and lower platens and associated press members of the press apparatus on the production line. If the depth of curvature of the subsequently produced part was substantially different, it might also be necessary to change the hydraulic actuator or cylinder for raising and lowering the lower platen to one having a different length of stroke. Each time the press members are changed within the press apparatus, it is necessary to level and align them for proper operation. The entire process is time consuming and ties up the line so as to result in a significant loss in production time.

In order to reduce the time required for changing from production of one part to another, it has been proposed to incorporate the press or shaping members into a so-called portable press bending apparatus whereby the entire press apparatus can be removed from the production line and replaced by a like apparatus having the appropriate shaping members. It is thus only necessary to disconnect a minimum of drive and control members, substitute one press apparatus for another, and reconnect the drive and control members. The changeover time is thus significantly shortened and the loss in production correspondingly reduced.

While the aforementioned procedure, wherein the shaping members can conveniently be installed in the press bending apparatus away from the production line, works well and represents a vast improvement over prior art press bending techniques, it has certain limitations. Thus, even though the shaping members may be installed in the press bending apparatus and adjusted for proper operation at a location remote from the production line, the press bending apparatus must be precisely positioned as it is installed in order for the mechanism to be properly aligned and levelled relative to the production line. This again may involve an undue expenditure of time and labor which prolongs the changeover time.

SUMMARY OF THE INVENTION

In accordance with the present invention, the aforementioned problems are overcome by mounting the press bending carriage apparatus upon wheels carried by rails extending transversely of the production line so that it can be rolled into and out of position in the production line. Means is provided for raising the carriage apparatus slightly to free it for movement into and out of operating position, and a centering device is provided for assuring proper transverse alignment of the carriage as it is lowered into operating position. Levelling supports are also provided for assuring proper longitudinal alignment of the press members and conveyor rolls with the adjacent heating and tempering sections.

It is, therefore, a primary object of the invention to provide an improved apparatus for press bending glass sheets to a variety of curved configurations.

Another object of the invention is to provide an improved mobile press bending apparatus which can be readily removed and replaced in a production line for changing from production of one glazing closure part to another.

Another object of the invention is to provide such press bending apparatus including means centering and levelling the press members upon installation of the apparatus in the production line.

Still another object is to provide such apparatus which can be removed and replaced with a minimum interruption in production on the line.

Other objects and advantages will become more apparent during the course of the following description when taken in connection with the accompanying drawings.

BRIEF DESCRIPTION OF THE DRAWINGS

In the drawings, wherein like numerals refer to like parts throughout:

FIG. 9 is an enlarged, fragmentary front elevation taken substantially along line 9—9 of FIG. 8;

FIG. 10 is a fragmentary end elevation, partly in section, taken substantially along line 10—10 of FIG. 9;

FIG. 11 is a vertical section taken substantially along line 11—11 of FIG. 10;

FIG. 12 is a top plan view taken substantially along line 12—12 of FIG. 11;

FIG. 14 is an enlarged fragmentary front elevation taken substantially along line 14—14 of FIG. 13;

FIG. 15 is an enlarged, fragmentary top plan view of the carriage wheel and latch mechanism of FIG. 14;

FIG. 16 is a vertical section taken substantially along line 16—16 of FIG. 15; and FIG. 17 is a vertical section taken substantially along line 17—17 of FIG. 16.

DETAILED DESCRIPTION OF THE PREFERRED EMBODIMENT

Figure 1:
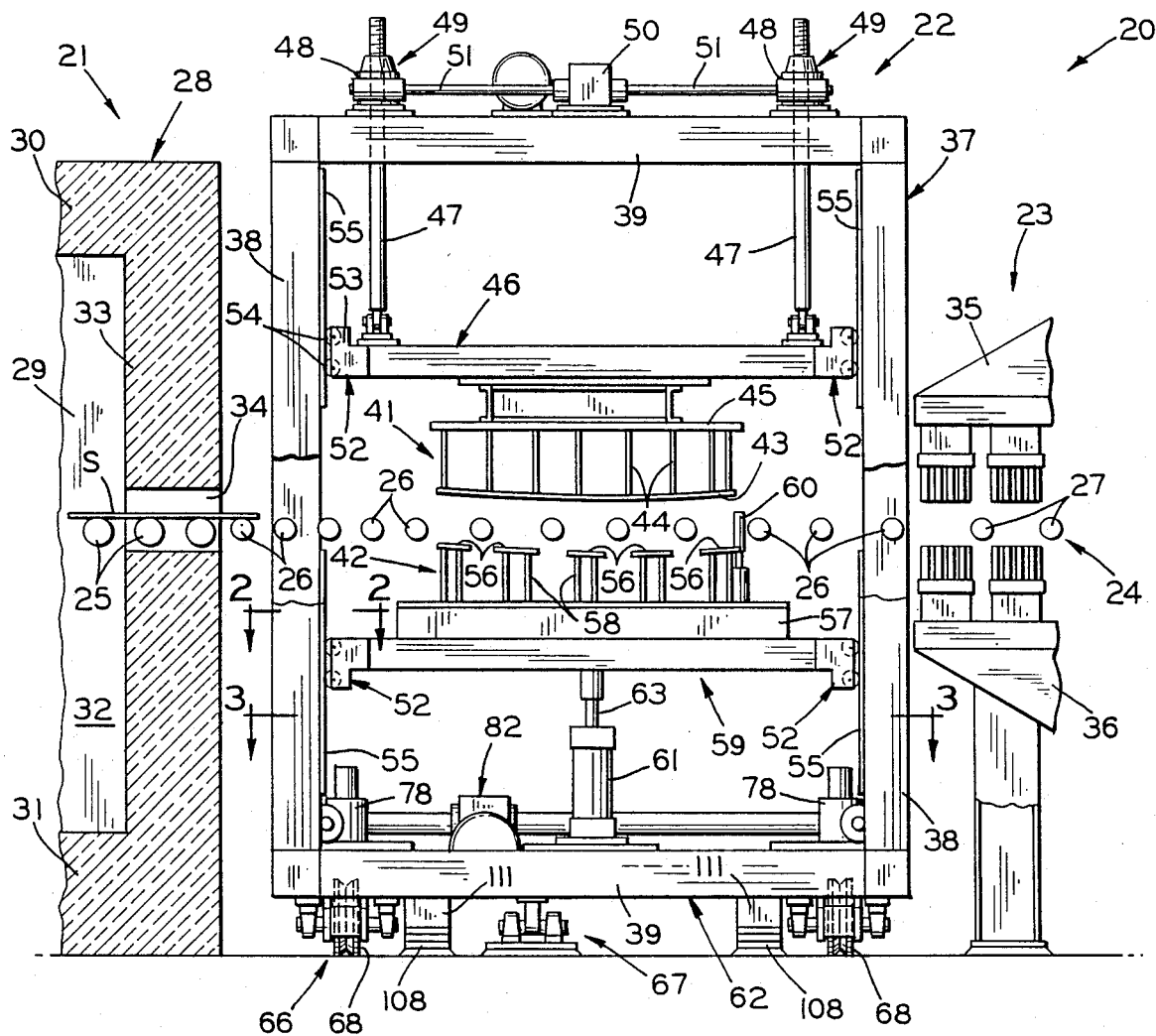
FIG. 1 is a side elevational view of a bending apparatus interposed between a glass heating furnace and a tempering section and incorporating the centering and levelling apparatus of the invention.

Referring now to the drawings, and in particular to FIG. 1, there is shown generally at 20 a glass sheet bending and tempering facility embodying the invention, including in continuous sequential alignment a heating section 21, a bending section 22 and a quenching or tempering section 23. Individual glass sheets S to be bent and tempered are supported and conveyed through the facility upon a roller conveyor system identified generally at 24. The roller conveyor more particularly includes a first section comprising rolls 25 for carrying the sheets through the heating section or furnace 21, a second section comprising rolls 25 for carrying the sheets into and through the bending section 22, and a third section comprising rolls 27 for conveying the bent sheets through the tempering section 23. The rolls 25, 26 and 27 are mounted and driven so that their upper surfaces define a series of generally horizontally aligned supports along which the sheets S are carried. As will be hereinafter more fully described, the rolls 26 are an integral part of the bending section 22 and are adapted to move into and out of operative position in the bending and tempering line therewith.

The heating section 21 is of any conventional construction and, as illustrated in FIG. 1, may comprise a tunnel-type furnace 28 having a heating chamber 29 defined by a roof 30, a bottom wall 31, opposite side walls 32 and an end wall 33. The chamber 29 may conventionally be heated as by gas fired burners or electrical resistance elements (not shown) positioned in the top and side walls and suitably controlled to provide a desired heating pattern for glass sheets moving therethrough. The sheets S are carried through the furnace on the rolls 25 of the roller conveyor 24, which extends from the entrance end (not shown) of the heating section and out through an opening 34 in the end wall 33. As the sheets S are conveyed through the chamber 29, they are heated to substantially the softening point of the glass and, 30 upon emerging through the opening 34 in the end wall 33, are received on the second series of rolls 26 for movement to and within the bending section 22, as will be hereinafter more fully described, between a pair of press members which impart the desired curvature to the sheets S.

After they are bent the sheets are advanced along the conveyor 24, passing from the press section rolls 26 onto the rolls 27 for movement through the tempering section 23. As shown in FIG. 1, within the tempering section the bent glass sheets pass between upper and lower blast heads 35 and 36, respectively, having a plurality of tubes disposed and operable to direct opposed streams of cooling fluid such as air or the like, toward and against the opposite surfaces of the sheets moving along the conveyor. Of course, if the bent sheets are to be annealed as for use in laminated windshields, the blastheads are not used and the sheets are instead allowed to cool slowly according to a desired pattern in a suitably controlled environment.

Turning now to a discussion of the press bending apparatus, as best shown in FIG. 1 the bending section 22 includes a mobile carriage, identified generally at 37, which is independent from the adjacent heating and tempering sections and which carries the press bending apparatus so that it is able to function as a self-contained unit for the bending of the glass sheets. The carriage comprises a skeletal framework, generally in rectangular parallelepiped form, and including upstanding corner posts 38 interconnected at their top and bottom by longitudinal beams 39 and transverse beams 40 to form a rigid, box-like structure. As will be apparent in FIGS. 2 and 3, the framework is preferably fabricated of square or rectangular tubular members. The press section rolls 26 are drivingly mounted upon the carriage in a conventional manner (not shown). Mounted within the skeletal framework of the carriage for reciprocating relative movement toward and away from each other are an upper male press member 41 and a lower female press member 42, having opposed complemental shaping surfaces conforming to the curvature to which the sheets are to be bent.

The male press member 41 may comprise a continuous shaping element 43 affixed as by connecting rods 44 to a base plate 45 which, in turn, is carried upon a platen frame 46. The platen frame is adapted to be vertically adjustable in order to accommodate glass parts bent to varying degrees of curvature between the male and female press members. To that end, the platen frame 46 is carried within the carriage framework at the lower ends of screw jack rods 47. The rods 47 are threadably received within rotatable collars 48 of screw jack bases 49 carried on a framework comprised by the beams 39 and 40 atop the carriage 37. A motorized drive unit 50 also carried atop the framework includes drive shaft 51 adapted to rotate the collars 48 in unison for retracting or extending the rods 47 to correspondingly raise or lower the platen frame 46 and shaping element 43 carried thereby. The platen frame 46 is similar in construction to the frame supporting the female press member 42 as will be hereinafter described.

Figure 2:
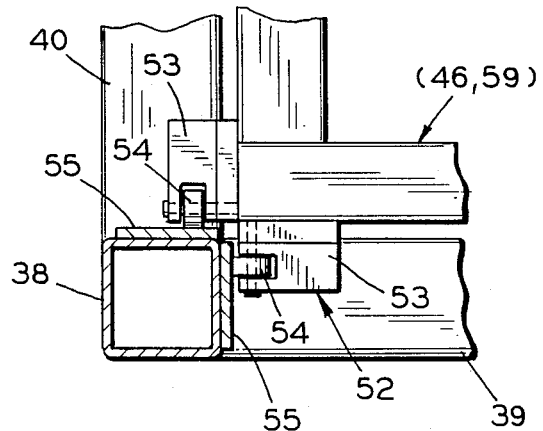
FIG. 2 is a fragmentary plan view, partly in section, taken substantially along line 2—2 of FIG. 1.

It is important to the operation of the apparatus that the frames move freely up and down along a precise vertical path within the carriage 37. To that end the platen frame 46 is provided at each of its corners with stabilizing roller guide means 52. As best shown in FIG. 2, the guide means comprises outwardly extending brackets 53 affixed to the platen frame 46 at its corners. Each bracket 53 carries a spaced pair of rollers 54 adapted to rollingly engage a track plate 55 affixed to the adjacent wall of the associated corner post 38. The platen frame 46 is thus held securely against transverse movement while being able to freely move up and down or, in other words, it is confined to movement along a vertical path.

The lower or female press member 42 is normally located below the press section rolls 26, and is mounted for vertical reciprocal movement to lift a sheet S from the rolls and press it against the upper male press member 41 and then deposit the bent sheet upon the rolls. In order to permit it to pass upwardly between the rolls 26 for lifting the sheets therefrom the female press member 42, which conventionally comprises a shaping rail of outline or ring type construction conforming to the outline of the sheet S to be bent thereon, is formed of a plurality of segments 56 spaced apart sufficiently to pass between adjacent ones of the rolls. The individual segments 56 are affixed in spaced relation to a base member 57 by connecting rods 58. The base member, in turn, is carried by a lower platen frame 59 having at its corners the stabilizing guide means 52 (FIG. 2) for confining the platen frame to vertical reciprocating movement within the framework of the mobile carriage. A pair of laterally spaced, vertically reciprocal stop means 60 is conventionally provided on the frame 59 between adjacent ones of the rolls 26 for accurately positioning incoming glass sheets S relative to the upper and lower press members 43 add 56.

A fluid activated cylinder 61, mounted on a base framework 62 defined by the beams 39 and 40, includes a piston rod 63 affixed at its distal end to the platen frame 59 for reciprocally moving the lower or female press member 42 between its lowered positions, whereat the ring segments 56 are beneath the conveyor rolls 26, and its raised position whereat the ring segments are adapted to lift a heated sheet S from the conveyor rolls and press it against the male press member 41 between the complementary shaping surfaces of the element 43 and the ring segments 56 to bend it precisely to a predetermined curvature. Upon completion of bending, the platen frame 59 is lowered to retract the ring segments 56 beneath the conveyor rolls 26 and deposit the bent sheet thereon for transfer to the tempering section 23.

Figure 3:
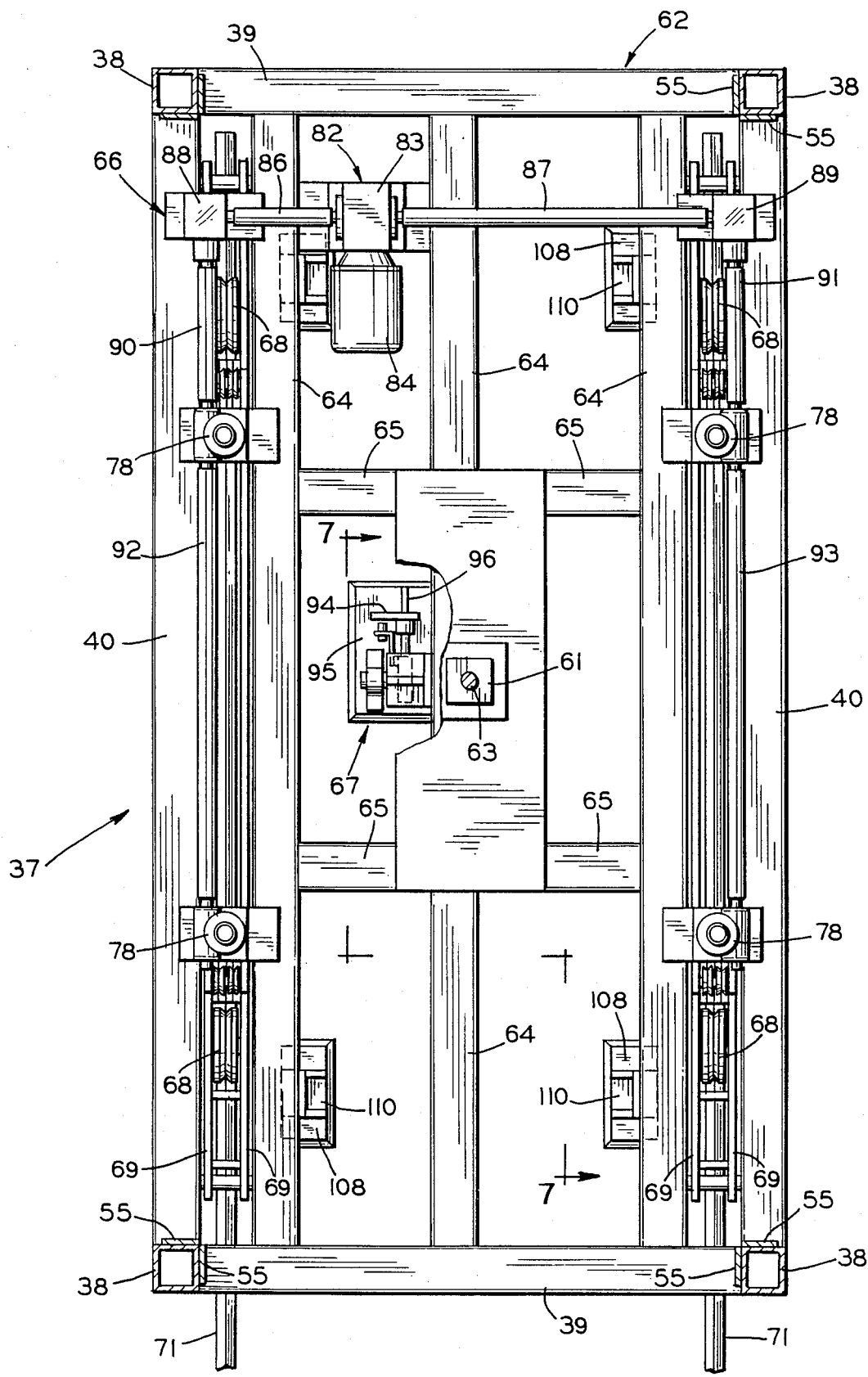
FIG. 3 is an enlarged top plan view, taken substantially along line 3—of FIG. 1.

As indicated above, the entire bending apparatus is incorporated in the mobile carriage 37, so that it can be removed and replaced as a unit in order to minimize the loss in production time in changing from production of one part to another. To that end the base framework 62 of the mobile carriage is constructed to include means for rollingly moving the carriage and associated press bending apparatus transversely into and out of operating position in the production line, and for quickly and precisely locating the carriage so that the rolls and press members are properly oriented to receive the flat sheet from the heating section 21 and advance the bent sheets into the tempering section 23. As best shown in FIG. 3 the base framework 62, comprising the longitudinal and transverse beams 39 and 40, respectively, affixed to the upstanding corner posts 38, further includes spaced interior transverse beams 64 extending between the beams 39, and spaced cross beams 65 extending between the beams 64 and defining a platform for mounting a transport mechanism and centering and locking mechanism, identified generally at 66 and 67, respectively, for the mobile carriage 37.

The transport mechanism is adapted to not only provide for transverse movement of the carriage, but also for vertical movement between a raised transport position and a lowered operating position. Thus, there is provided adjacent each lower corner of the base framework 62 a lift wheel assembly including a grooved wheel 68 rotatably mounted between spaced rocker arms 69 pivotally attached at one and between the longitudinal beams 40 and 64 by means of brackets 70. The grooved peripheries of the wheels are adapted to receive and ride upon correspondingly shaped parallel rails 71 affixed to or recessed into the floor 72 of the facility. The rails may, for example, be in the form of inverted angle members.

Figure 4:
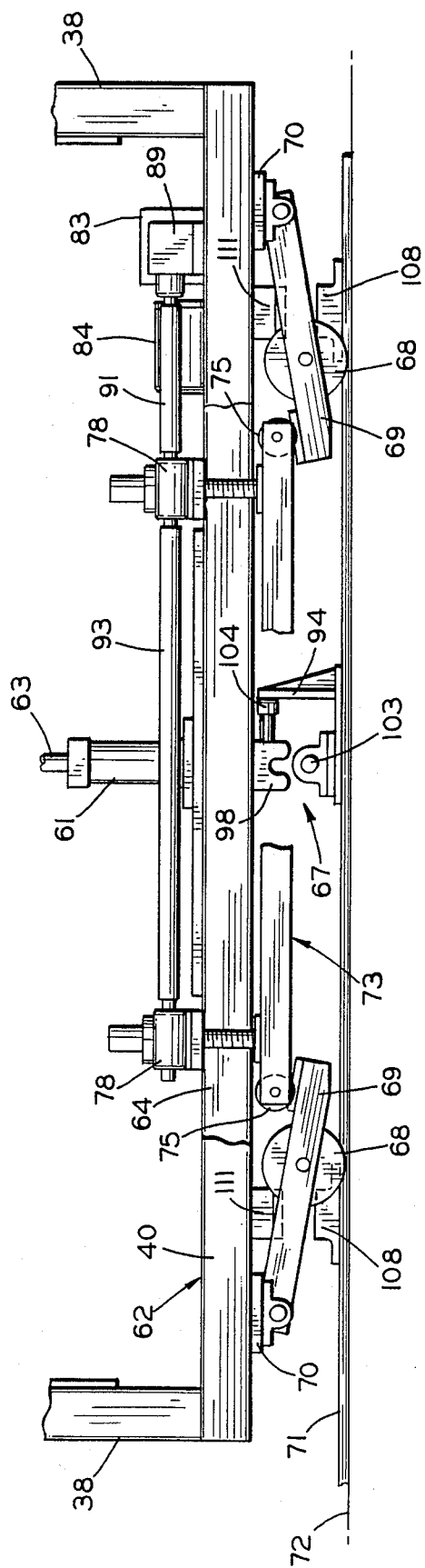
FIG. 4 is a side elevation of the carriage base of the mobile press bending apparatus showing the carriage in raised, transport position.
Figure 5:
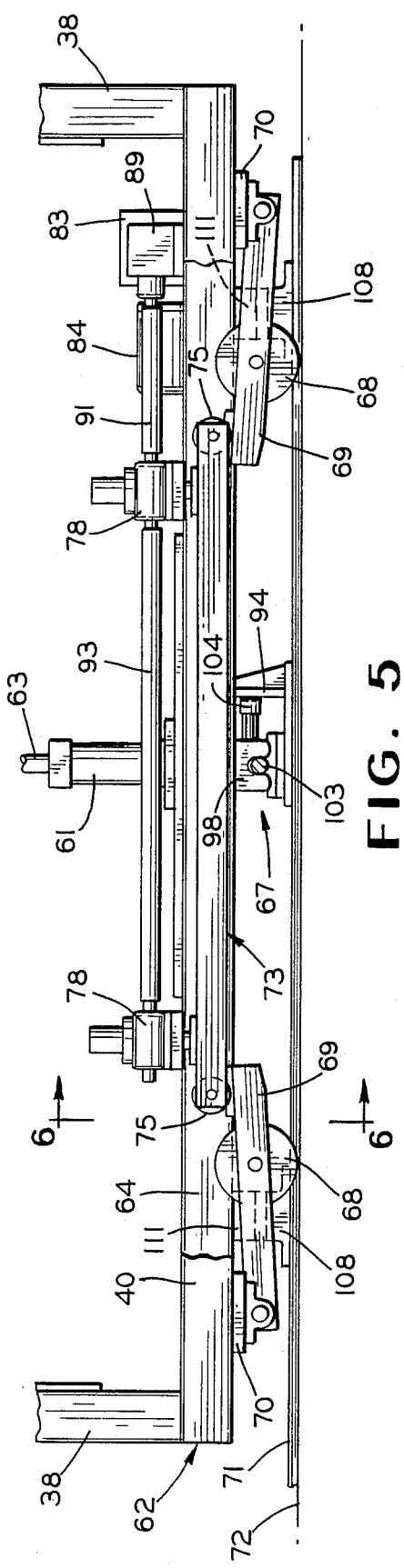
FIG. 5 is a side elevation similar to FIG. 4, showing the carriage in the lowered, operating position.
Figure 6:
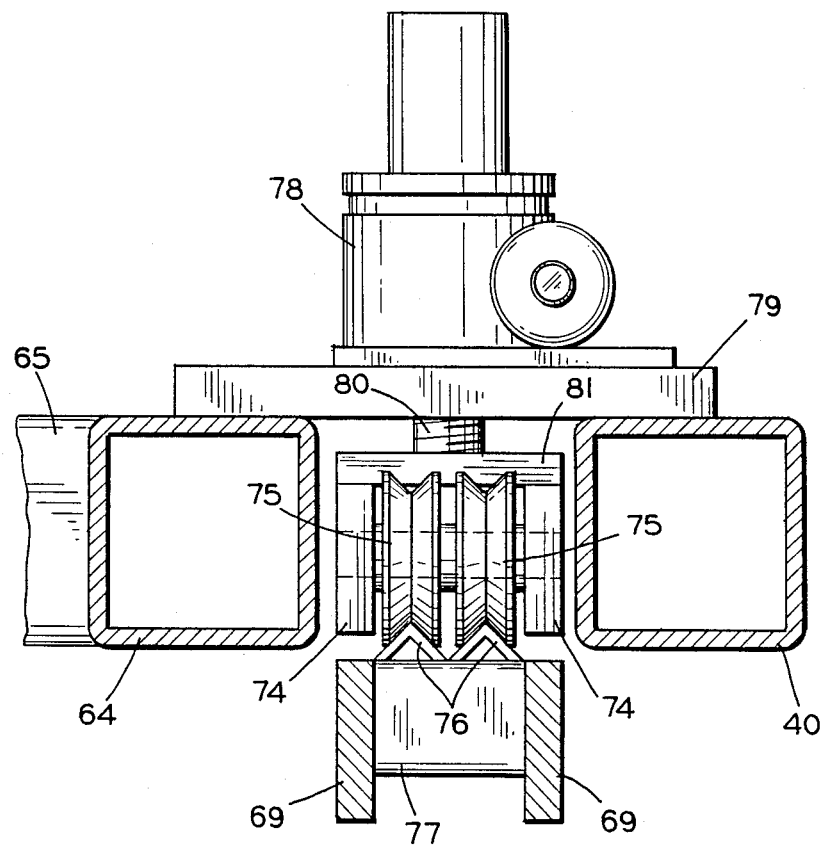
FIG. 6 is an enlarged, fragmentary end elevation, partly in section, taken substantially along line 6—6 of FIG. 5.

The arms 69 conveying the wheels 68 are adapted to pivot at the bracket 70 for raising and lowering the carriage. The operating mechanism for doing so, as best shown in FIGS. 4, 5 and 6, includes an elongated operating bar 73 extending between the opposed and aligned lift wheel assemblies at either side of the carriage. The lift bar more particularly comprises a pair of spaced plate members 74 having a pair of axially aligned grooved rollers 75 (FIG. 6) rotatably mounted therebetween at each end, the ground rollers being adapted to roll along matching short rail sections 76 carried astride the rocker arm 69 on a cross member 77. A rotary jack 78 positioned above each end of the operating bar is mounted upon a plate 79 carried by the beams 40 and 64. The spindle 80 of each rotary jack is coupled at its lower end to a plate 81 spanning the plate members 74. Thus, as will be apparent in FIGS. 4 and 5, as the spindle is extended or retracted by operation of the rotary jack, the associated end of the operating bar 73 will be correspondingly lowered or raised to, in turn, cause the rocker arm 69 to pivot downwardly or upwardly and raise or lower the carriage 37.

The four rotary jacks 78 are operated in unison by a single drive unit 82 carried upon the base framework 62 for vertically raising or lowering the carriage. Thus, a gear reduction unit 83 of the drive unit, operatively connected to a reversible motor 84, has oppositely disposed output shafts 86 and 87 connected to gear boxes 88 and 89, respectively, at either side of the carriage. Drive shafts 90 and 91 from the gear boxes are operatively connected to the rotary jacks 78 at the proximal end of the carriage, while extension shafts 92 and 93 of the shafts 90 and 91, respectively, are operatively connected to the rotary jacks at the distal end of the carriage. Thus, by operating the motor in the appropriate direction the four rotary jacks will be operated in unison to extend or retract their spindles 80, and thereby to move the carriage between the raised and lowered positions of FIGS. 4 and 5, respectively.

Figure 7:
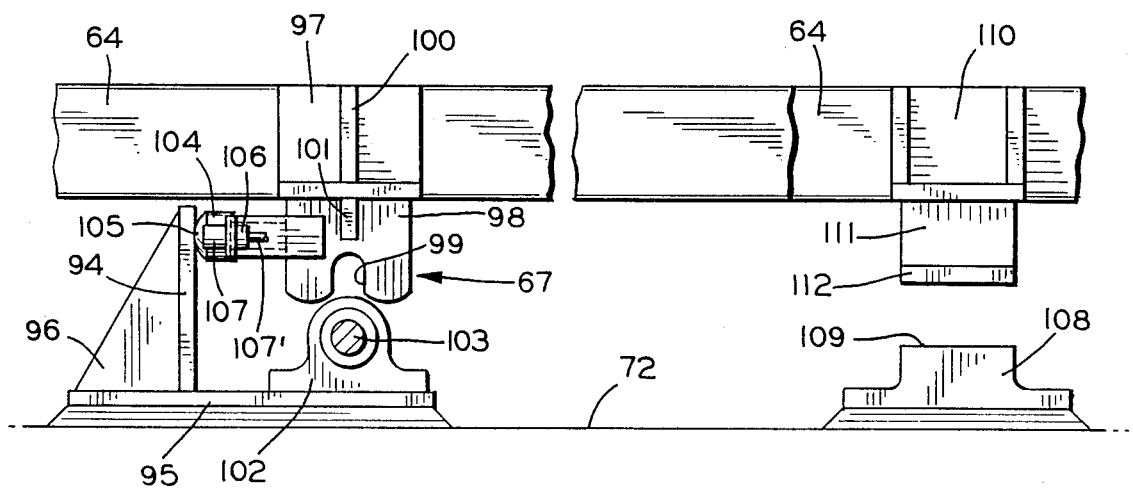
FIG. 7 is an enlarged, fragmentary side elevation taken substantially along line 7—7 of FIG. 3.
Figure 8:
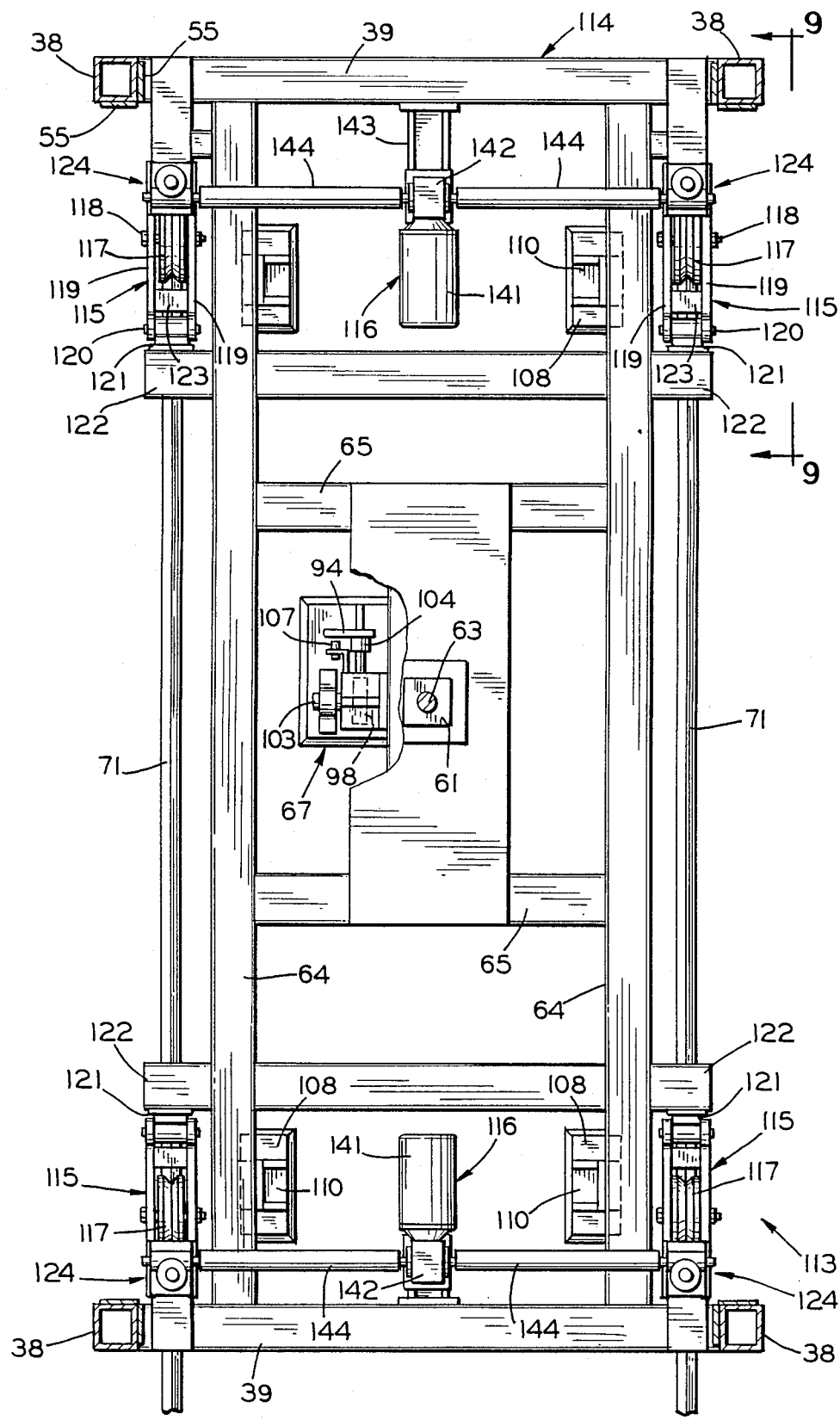
FIG. 8 is an enlarged top plan view similar to FIG. 3, showing an alternate embodiment of the carriage base of the invention; 10
Figure 13:
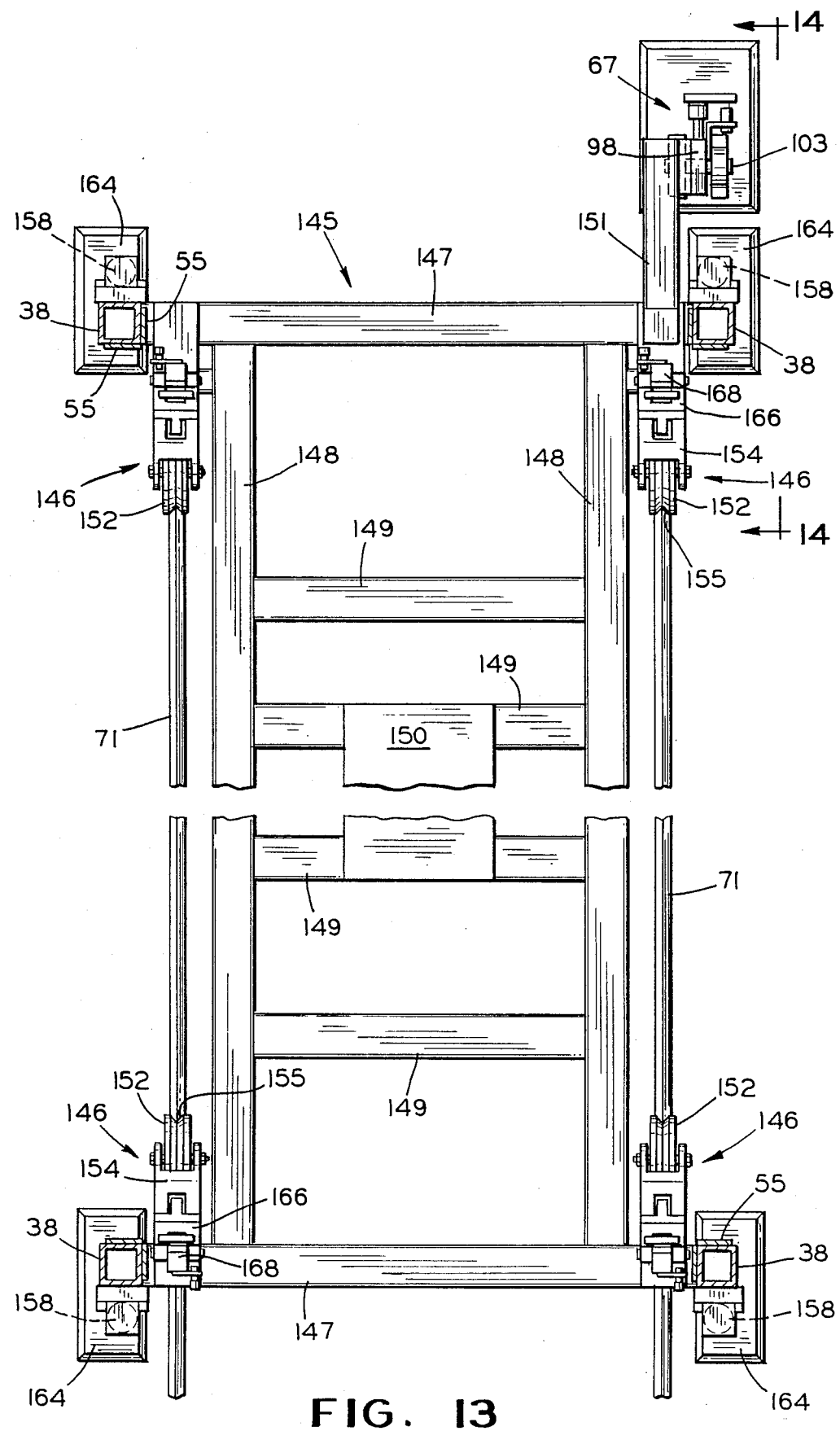
FIG. 13 is an enlarged top plan view similar to FIGS. 3 and 8, showing still another embodiment of the carriage base of the invention.

In order to facilitate precise lateral positioning of the carriage in its operative position in the production line, and to secure the carriage in that position, there is provided therebeneath the aforementioned centering and locking mechanism, indicated generally at 67. The mechanism, best seen in FIG. 7, includes an upstanding stop plate 94 affixed to a base plate structure 95 on the floor 72 of the facility. A rib or fillet 96 is provided behind the stop plate for strengthening purposes. An angle member 97 affixed to the beam 64 carries a saddle plate 98 having a downwardly opening recess 99 therein. The angle member 97 and saddle plate 98 are provided with strengthening webs 100 and 101, respectively. Also mounted on the base plate structure 95 is a spaced pair of pillow blocks 102, one on either side of the saddle plate 98, and having a freely rotatable shaft 103 extending therebetween. The shaft is adapted to be received within the recess 99 of the saddle when the carriage 37 is in the lowered, working position as shown in FIG. 5.

As will be apparent in FIG. 4, when the mobile carriage is moved out of operative position it moves from right to left along the rails 71, and from left to right for movement into operative position. In order to assist in aligning the recess 99 with the shaft 103 as the carriage is rolled into place, there is affixed to the saddle plate 98, in position to cooperate with the stop plate 94, a bumper 104 having a resilient head 105 for engaging the stop plate, and a proximity switch 10. The proximity switch includes a sensing head 107, operable to generate a signal at a predetermined distance from the stop plate, which is transmitted in a conventional manner as by a line 107' to activate the motor 84 of the drive unit 82 and retract the wheels 68 for lowering the mobile carriage. The recess 99 will be approximately centered over the shaft 103 due to engagement of the stop plate by the resilient head of the bumper 104. In order to accommodate slight misalignment of the recess and shaft, the lower edge of the saddle plate 98 is formed with rounded edges on either side of the slot which curve upwardly and inwardly toward the slot. Thus, should the slot not be centered perfectly over the rotatable shaft, the rounded edge will guide the shaft into the slot and shift the carriage as it is lowered so that the carriage will be automatically and precisely centered each time it is moved into operative position.

In order for the press bending apparatus to function properly, it is necessary that it also be at the proper elevation relative to the adjacent heating and tempering sections and suitably levelled each time a mobile carriage is moved into operating Position. To avoid the necessity for time-consuming manual verification of elevations each time the bending section is changed, there is provided a system of levelling supports for the carriage independent of the transport mechanism 66 so that as each mobile carriage is moved into operative position in the production line, it is set to the same reference level. More particularly, there is provided on the floor 72 beneath each corner region of the carriage a pedestal 108 having an upwardly-facing load-bearing surface 109. Mounting brackets 110 affixed to the interior beams 64 of the base framework 62 carry support blocks 111 adapted to be positioned, one over each pedestal, with the carriage in operable position. A shim plate, or plates, 112 of suitable thickness may be affixed to the bottom of each support block as necessary so that when the carriage is lowered into operating position as shown in FIG. 4, with the shim plates resting upon the surfaces 109 of the pedestals, the rolls 26 and press members 41 and 42 on the mobile carriage will be level and at the proper elevation. The conveying and bending members are set relative to a fixed reference plane on the carriage. Thus, once the carriage is set and levelled with appropriate shim plates 112, the mechanism will return to the proper elevation and alignment each time the mobile carriage is rolled into position and lowered onto the pedestals and centering and locking mechanism.

There is shown in FIGS. 8 through 12 an alternate embodiment of the invention employing a somewhat different construction for the base and transport mechanism of the mobile carriage. In other respects, the construction is generally identical to the aforedescribed embodiments. Thus, as will be readily seen in FIGS. 8 and 9, the embodiment includes a transport mechanism, identified generally at 113, affixed to a modified base framework 114 of the mobile carriage 37. More particularly, the framework 114 includes the basic interconnected corner posts 38, longitudinal beams 39, transverse beams 64 and cross beams 65. The transport mechanism 113 includes individual lift units 115, operatively affixed to the base framework, one at each corner, for raising, lowering and laterally moving the mobile carriage into and out of operative position within the production line. Jack drives, identified generally at 116, are provided at either side of the framework for operating the lift units on that side.

For purposes of illustration, the lift unit 115 is shown in solid line in FIGS. 9 and 11 in the lowered or operating position, and in broken line in the raised or transport position. Each unit more particularly includes a wheel 117 having a grooved periphery for riding on the rails 71, rotatably mounted on an axle 118 between spaced arms 119 pivotally connected at one end by a pin 120 to a bracket 121 affixed to a cross beam 122 of the base framework. The spaced arms are interconnected by a spaced member 123.

The arms 119 carrying the wheel 118 are caused to pivot about the pin 120, thereby extending or retracting the wheel, by a jack mechanism identified generally at 124. The jack mechanism includes a jack base 125 affixed to the base framework and having a rotary spindle 126 adapted to be conventionally rotated in either direction about its longitudinal axis by the jack drive 116. The spindle is threadably received in and passes through a collar 127 carrying, on either side of the spindle, a roller assembly 128. Each roller assembly includes a pair of spaced end plates 129 having a pair of first rollers 130 mounted on axles 131 extending therebetween, with their peripheral surfaces adapted to rollingly engage a bearing plate 13, affixed to the base framework. A second roller 133 is also mounted between the spaced end plates of each roller assembly by means of an axle 134.

As best seen in FIGS. 11 and 12, the rotary spindle 126 is adapted to project downwardly through an elongated, open-sided slot 135 formed in a horizontal leg 136 of an angle bracket 137 affixed between the arms 119. Strengthening gussets 138 are provided beneath the horizontal leg on either side of the slot, and the upper surface of the leg is recessed to receive a wear plate 139 along which the rollers 133 travel for extending and retracting the wheels 117 as will be hereinafter explained. Guide plates 140 at either side of the jack base 125 overlap the side edges of the bearing plate 132 (FIG. 9) for confining the roller assembly to movement along a vertical path.

There is provided at each edge of the base framework 114 a jack drive unit 116 for operating the jack mechanisms 124. Although separate drive units have been shown for operating the two jack mechanisms at each edge, it will be understood that all four mechanisms may be powered from a single drive unit though appropriate shafting as in the aforedescribed embodiment. The jack drives 116 comprise a motor 141 and associated gear reduction unit 142 affixed to the base framework 114 by a mounting bracket 143. Shafts 144 driven by the reduction unit extend to the jack bases 125 to, in turn, rotate the spindles 126 of the two jack mechanisms 124 in unison. As the spindles are rotated within the collars 127, the roller assembly 128 is caused to move axially along the spindle. The rollers 130 thus move up or down, as the case may be, along the bearing plate 132, and the rollers 133 move along the wear plate 139. Thus, as shown in FIGS. 9 and 11, by manipulating the drive unit the lift units 115 can be moved between the retracted position illustrated in solid line and the extended position shown in broken lines, to correspondingly move the mobile carriage between the lowered, operating position and the raised, transport position. It will be understood, of course, that the centering and locking mechanism 67 and the levelling mechanism including the pedestals 108 and support blocks 111, function therewith in accordance with the procedure outlined in describing the aforedescribed embodiment.

There is illustrated in FIGS. 13 through 17 still another construction of the base and transport mechanism for the mobile carriage in accordance with the invention. As will be seen in FIG. 13, in particular, in this embodiment the base for the mobile carriage 37 includes a base framework, identified generally at 145, of modified construction wherein the centering and locking mechanism 67 as well as the levelling stands, are located outside the base framework. There is provided a modified transport mechanism 146 comprising individual hydraulic jacking means at each corner for raising and lowering the mobile carriage, with wheels which are locked in extended position for moving the mobile carriage into and out of operative position and then unlatched to allow the carriage to be lowered to the operative position by the hydraulic jacking means.

Accordingly, the base framework 145 is comprised of longitudinal beams 147 connected at their ends to the corner posts 38 and interconnected by transverse beams 148. Cross beams 149 extend between the transverse beams at spaced locations therealong, with the center cross beams carrying a base plate 150 for mounting the fluid activated cylinder 61. The centering and locking mechanism 67 is affixed to an arm 151 extending from one of the corner posts 38 so that it is located alongside the bending section 22 for ready accessibility upon movement of the mobile carriage into operable position.

The modified transport mechanism 146 includes adjacent each corner of the base framework 145 a wheel 152 rotatably mounted upon an axle 153 carried by a bifurcated arm 154 and having a grooved or V-shaped peripheral rim 155 for accommodating the rails 71. The arm is mounted for pivoted, swinging movement by a pivot pin 156 upon a bracket 157 affixed to the base framework. The wheel is thus able to swing about the pivot pin 156 between an extended position as shown in FIG. 14, whereat the wheel is on the rail 71 and the mobile carriage 37 is in a raised transport position, and a retracted position (not shown) where the carriage is in its lowered working position.

As best seen in FIG. 14, raising and lowering of the mobile carriage between the operating and transport positions is accomplished by means of suitably controlled and coordinated hydraulic cylinders 158 carried by the framework, one at each corner. Extensible piston rods 159 project downwardly from the cylinders and carry at their distal ends pads 160. A base 161 located beneath the carriage in its operative position includes an upwardly directed array of freely rotatable rollers 162 positioned to be engaged by the pad 160 when the piston rod is extended. As will b hereinafter more fully explained, as the carriage is lowered into engagement with the centering and locking mechanism 67, it is able to shift laterally as necessary on the rollers while supported upon the pads 160 so as to freely center the recess 99 over the shaft 103 of the centering and locking mechanism.

In order to enable the piston rods 159 to be retracted for disengaging the pads 160 from the rollers 162 with the mobile carriage in the raised transport position, the supports for the wheels are provided with mechanisms for releasably latching the wheels in the extended position. As hereinabove explained, the arms 154 pivot about the pins 156 so that the wheels 152 can move between the extended, transport position of FIG. 14 and a retracted operating position (not shown) whereat the recess 99 of the saddle plate 98 engages the shaft 103 of the centering and locking mechanism 67. As in the previously described embodiments, there is also provided levelling means so that the carriage assumes a properly levelled attitude as it is lowered to the operating position. To that end, a support block 163 is provided beneath the beam 147 at each corner of the framework. The support block is adapted to engage and rest upon a surface 164 defined at the proper elevation by one or more shims 165 on the base 161.

The latch mechanism for the wheels more particularly includes a latch finger 166 having bifurcated arms 167 at its rear. The latch finger is pivotally attached to a mounting extension 168 on the bracket 157 by a pin 169 extending through the arms 167. Affixed within each of the arms 167 is a latch finger biasing device 170 having a spring loaded extensible plunger 171 engaging the undersurface of a biasing plate 172 affixed to the mounting extension 168 as by stud bolts 173. The biasing device thus urges the latch finger 166 downwardly about the pivot pin 169 toward the arm 154.

A tension spring 174 attached at one of its ends to the arm 154 and at its other end to the bracket 157 biases the arm 154 and the wheel 152 thereon toward the extended position as shown in FIG. 14. Thus, as the mobile carriage is raised by the cylinders 158, the wheels will be extended and conversely, unless they are latched in the extended position, they will be caused to retract by the weight of the carriage as it is lowered by the cylinders. In order to permit selective locking of the wheels in their extended position for transport of the mobile carriage, the arm 154 is formed at its upper end with spaced extensions 175 defining a channel 176 therebetween and having forward facing walls 177. The latch finger 166 is likewise formed with a projection 178 adapted to extend into the channel 176 between the extensions 175, and end walls 179 on either side of the projection adapted to engage behind the walls 177. Due to the biasing action of the spring loaded plungers 171, the latch finger will be urged downwardly to position the end walls 179 behind the walls 177 when the wheel is in its fully extended position. If the pistons 159 are then retracted, the arm 154 will pivot upwardly until the walls 179 engage the walls 177, and the finger will latch the arm, and wheel 152 thereon, in the extended transport position.

In order to lower the mobile carriage to operating position, the piston rods 159 are extended to the position shown in broken lines in FIG. 14 to elevate the carriage slightly and remove the weight from the wheels 152. The latch fingers 166 are then pivoted upwardly to the broken line position of FIG. 14, so that as the piston rods are retracted the arm 154 will pivot upwardly and allow the carriage to be lowered. For purposes of releasing the latches, there is provided beneath each latch finger a hydraulic latch release mechanism, indicated generally at 180. More particularly, the mechanism may comprise a small hydraulic cylinder 181 threadably inserted into a bore 182 in the base of a recess 183 in the channel 175. A piston rod 184 extending from the cylinder is adapted to engage the undersurface of the projection 178 of the latch finger. The cylinder 181 and bore 182 are in fluid communication, by means of a passageway 185 and coupling 186, with a suitably controlled source (not shown) of hydraulic fluid. It will thus be readily apparent that as hydraulic fluid is admitted to the cylinder under pressure through the passageway, the piston rod will be extended to pivot the latch finger 166 upwardly as shown in broken line in FIG. 15. Likewise, when the supply of pressurized fluid is discontinued, the spring loaded plunger 171 will urge the latch finger downwardly and retract the piston rod 184.

In order to coordinate the functions of the latch fingers and the main lift cylinders 158, there is provided at the forward end of each latch finger an upstanding activating arm 187. A proximity switch 188 is mounted in fixed position on a second arm 189 affixed to the mounting extension 168 of the bracket 157. Thus, when the latch finger is pivoted upwardly to the released position by the release mechanism 180, the activating arm will likewise swing toward and activate the proximity switch, providing a signal to the control system (not shown) for the main cylinders 158 that the latch is in the released position.

It is to be understood that the forms of the invention herewith shown and described are to be taken as illustrative embodiments of the same, and that various changes in the shape, size and arrangement of the parts may be resorted to without departing from the spirit of the invention.

What is claimed is:

1. In glass sheet bending apparatus of the type including, in aligned sequence, heating, press bending, and tempering sections, said press bending section comprising upper and lower bending members and associated conveyor rolls operatively mounted upon a mobile carriage for movement as a unit transversely into and out of operative position in said aligned sequence, the improvement wherein said mobile carriage includes a base framework, wheels affixed to said base adapted for movement along spaced carriage rails, means vertically moving said base and carriage between a raised transport position whereat said wheels are extended for supporting said carriage upon said rails and a lowered operating position whereat said wheels are retracted, means for supporting said carriage at a predetermined elevation in said operating position with said wheels retracted, and means carried by said base for locating said carriage in a predetermined position of transverse alignment relative to said heating and tempering sections and securing said carriage in said predetermined position.

2. Glass sheet bending apparatus as claimed in claim 1, including an arm upon which each said wheel is mounted, and pivot means affixing each said arm to said frame whereby said wheels swing about said pivot means on said arms between said extended end retracted positions.

3. Glass sheet bending apparatus as claimed in claim 1, wherein said means for supporting said carriage with said wheels retracted comprises a plurality of pedestal means positioned beneath said framework with said carriage in said operating position, and corresponding support blocks on said framework for engaging and resting upon said pedestal means whereby said carriage is at said predetermined elevations.

4. Glass sheet bending apparatus as claimed in claim 1, wherein said carriage locating and locking means comprises a fixed stop member, a bumper on said carriage for engaging said stop member as said carriage is advanced into said operating position, a fixed aligning member, and means on said base adapted to cooperate with said fixed aligning member for shifting said carriage as it is lowered precisely to said predetermined position of transverse alignment and securing said carriage in said predetermined position.

5. Glass sheet bending apparatus as claimed in claim 2, wherein said base framework is generally rectangular in plan, including a said wheel adjacent each corner of said base, jack means affixed to said base adjacent each said corner operatively connected to said arms for pivoting said arms about said pivot means, and means reversibly driving said jack means for extending and retracting said wheels.

6. Glass sheet bending apparatus as claimed in claim 5, wherein pairs of said wheels are longitudinally aligned, including an operating bar extending between the free ends of aligned ones of said arms, a said jack means at each end of said bar having a reciprocal spindle bearing against said bar, and roller means at the ends of said operating bar in rolling engagement with said arms.

7. Glass sheet bending apparatus as claimed in claim 6, wherein said means reversibly driving said jack means comprises a single drive means for simultaneously driving all of said jack means.

8. Glass sheet bending apparatus as claimed in claim 5, wherein each said jack means includes a rotary spindle, a collar threadably mounted on said spindle for movement therealong as said spindle is rotated, a roller assembly affixed to said collar, and a bracket on said arm including an elongated slot through which said spindle extends, said roller assembly including rollers bearing against said bracket on either side of said spindle.

9. Glass sheet bending apparatus as claimed in claim 5, including a fixed stop member, a bumper on said carriage for engaging said stop member as said carriage is advanced into said operating position, and a proximity switch on said carriage positioned to be activated by said stop member for generating a signal to operate said means driving said jack means and lower said carriage.

10. Glass sheet bending apparatus as claimed in claim 8, including a drive unit operable to drive the pair of jack means for the transversely aligned wheels at each end of said base framework.

11. Glass sheet bending apparatus as claimed in claim 2, wherein said base framework is generally rectangular in plan, including a said wheel adjacent each corner of said base, jack means affixed to said base adjacent each corner, each said jack means comprising a downwardly directed extensible and retractable shaft having a pad at its lower end, a base positioned beneath said jack means with said carriage in the operative position, and a roller array on said base adapted to engage said pad for accommodating lateral shifting of said carriage while supported by said jack means.

12. Glass sheet bending apparatus as claimed in claim 11, wherein said arms are mounted to pivot freely between the extended and retracted positions for said wheels, including spring means biasing said arms and wheels toward the extended position while allowing said wheels to retract in response to the applied load as said carriage is lowered to said operating position, and latch means for selectively locking said arms and wheels in the extended transport position.

13. Glass sheet bending apparatus as claimed in claim 12, wherein said latch means includes a latch finger pivotally mounted upon said base and adapted to move into locking position as said wheel and arm are extended by said spring means, and means normally biasing said latch finger toward said locking position.

14. Glass sheet bending apparatus as claimed in claim 13, including a latch release mechanism for each said wheel comprising a reciprocable plunger positioned to engage said latch finger, and means selectively extending said plunger to pivot said finger against said biasing means out of said locking position.

15. Glass sheet bending apparatus as claimed in claim 14, including an actuating arm mounted on said latch finger for pivotal movement therewith, and a proximity switch positioned to be activated by said actuating arm as said latch finger is pivoted out of locking position by said plunger, said proximity switch being adapted to generate a signal for transmission to the corresponding jack means indicative of the released position of the latch fingers.

16. Glass sheet bending apparatus as claimed in claim 2, wherein said means for supporting said carriage with said wheels retracted comprises a plurality of pedestal means positioned beneath said base framework, and corresponding support blocks on said framework for engaging and resting upon said pedestal means whereby said carriage is at said predetermined elevation, said carriage locating and locking means comprising a fixed step member, a bumper on said carriage for engaging said step member as said carriage is advanced into operating position, a fixed aligning member, and means on said base framework adapted to cooperated with said fixed aligning member for shifting said carriage precisely to said predetermined position of transverse alignment as it is lowered and securing said carriage in said predetermined position.

17. Glass sheet bending apparatus as claimed in claim 16, wherein said fixed aligning member comprises a cylindrical shaft extending transversely of said carriage rails, said cooperating means on said base framework comprising a saddle plate extending transversely of said cylindrical shaft and a correspondingly shaped open-ended recess in said saddle plate adapted to receive said cylindrical shaft as said carriage is lowered to operating position, said saddle plate including rounded edges on either side of said recess for laterally shifting said carriage to correct misalignment of said recess with said cylindrical shaft.

* * * * *

UNITED STATES PATENT AND TRADEMARK OFFICE
CERTIFICATE OF CORRECTION

PATENT NO.  : 4,872,898
DATED       : October 10, 1989
INVENTOR(S) : Allan T. Enk and Jeffrey R. Flaugher It is certified that error appears in the above-identified patent and that said Letters Patent is hereby corrected as shown below:

Column 1, line 50, delete "10"; line 64, after "course" insert a comma (,).

Column 3, line 27, delete "10"; same line, "FIG. 9" should begin a new paragraph.

Column 4, line 19, delete "30".

Column 7, line 31, change "10" to --106--; line 53, change "Position" to --position--.

Column 10, line 14, change "b" to --be--.

Signed and Sealed this

Fifth Day of March, 1991

Attest:

HARRY F. MANBECK, JR.

*Attesting Officer*   *Commissioner of Patents and Trademarks*